US008689580B2

(12) United States Patent
Lakdawala et al.

(10) Patent No.: US 8,689,580 B2
(45) Date of Patent: Apr. 8, 2014

(54) AIR CONDITIONING/DEHUMIDIFYING UNIT

(76) Inventors: Ness Lakdawala, St. Lambert (CA); Gary Jones, Ste Marthe sur le Lac (CA)

(*) Notice: Subject to any disclaimer, the term of this patent is extended or adjusted under 35 U.S.C. 154(b) by 224 days.

(21) Appl. No.: 13/065,846

(22) Filed: Mar. 30, 2011

(65) Prior Publication Data
US 2012/0247132 A1 Oct. 4, 2012

(51) Int. Cl.
*F25D 17/06* (2006.01)
(52) U.S. Cl.
USPC .................................. 62/411; 62/412; 62/428
(58) Field of Classification Search
USPC .............. 62/79, 428, 238.6, 189, 187, 93, 89, 62/411, 412; 454/265, 347
See application file for complete search history.

(56) References Cited

U.S. PATENT DOCUMENTS

| | | | | | |
|---|---|---|---|---|---|
| 3,831,395 | A | * | 8/1974 | Levy | 62/263 |
| 4,379,484 | A | * | 4/1983 | Lom et al. | 165/251 |
| 4,827,733 | A | * | 5/1989 | Dinh | 62/305 |
| 5,309,725 | A | * | 5/1994 | Cayce | 62/90 |
| 5,361,511 | A | * | 11/1994 | Brown | 34/468 |
| 5,715,701 | A | * | 2/1998 | Kreymer | 62/419 |
| 5,826,641 | A | * | 10/1998 | Bierwirth et al. | 165/48.1 |
| 6,038,879 | A | * | 3/2000 | Turcotte et al. | 62/325 |
| 6,155,074 | A | * | 12/2000 | Jung et al. | 62/506 |
| 7,231,967 | B2 | * | 6/2007 | Haglid | 165/231 |
| 7,251,953 | B2 | * | 8/2007 | Wetzel et al. | 62/419 |
| 8,047,014 | B2 | * | 11/2011 | Yabu et al. | 62/324.5 |

FOREIGN PATENT DOCUMENTS

JP 2004108603 A * 4/2004

OTHER PUBLICATIONS

Abstrat of JP 2004-108603 to Kimura et al.*
Treanslation to JP 2004-108603 to Kimura et al.*

* cited by examiner

*Primary Examiner* — Mohammad M Ali

(57) ABSTRACT

An air conditioning unit having: a first air passageway and a second air passageway adjacent to the first air passageway. Dampered air inlets are provided at one end of the first and second air passageways to selectively provide indoor air or outdoor air to each passageway. There is an indoor air outlet in the first air passageway and an outdoor air outlet in the second air passageway, both outlets at the other end of the passageways. There is a first blower in the first passageway and a second blower in the second passageway for moving air through each passageway. The unit has a refrigerant system with an evaporator in the first passageway, a compressor, a condenser in the second passageway, and a refrigerant line joining the evaporator, the compressor, and the condenser, in series, in a closed loop. The unit can be used in an air conditioning mode, a dehumidifying mode and a purge/ventilating mode. The unit is particularly suited for use in an indoor swimming pool.

27 Claims, 3 Drawing Sheets

AIR CONDITIONING/DEHUMIDIFYING UNIT

BACKGROUND OF THE INVENTION

1. Technical Field

This invention is directed toward an air conditioning/dehumidifying unit and a method of operating the unit. The invention is more particularly directed toward an air conditioning/dehumidifying/pool water heating unit for use with indoor swimming pools and to a method for operating the unit.

2. Background Art

Air conditioning/dehumidifying units normally have air passageway means with a main passageway and air inlets and outlets associated with the main passageway. The units have refrigeration means with an evaporator, followed by a first condenser, in the main passageway and a second condenser outside the main passageway and usually outside the building housing the main passageway. Fan means are provided to draw the air to be conditioned/dehumidified through the passageway including through the evaporator and the first condenser in the passageway. The first condenser in the passageway is used to reject heat during dehumidification. The second condenser outside the passageway is used to reject heat during air conditioning.

Having the second condenser outside the passageway, and usually outside the building housing the passageway, on most air conditioning/dehumidifying units, particularly those used for indoor swimming pools, has a number of disadvantages. The location of the second condenser, separated as it is from the remainder of the unit, requires a relatively large amount of refrigerant for proper operation of the unit. The large amount of refrigerant required is quite expensive and to replace any leakage is also expensive. The use of a large amount of refrigerant also requires the use of refrigerant oil adding to the cost. The use of a large amount of refrigerant further requires many controls, including costly control valves, to protect the compressor from liquid flood back. The installation of the control valves, involving brazed joints, is costly. Servicing and/or replacement of the valves is also costly. Also, the shipping and installation of the second condenser is relatively complicated and expensive. Installation requires construction of a separate pad for the second condenser; a separate electrical service; the installation of associated refrigerant piping at the site to connect the condenser to the rest of the unit; the loading of the refrigerant charge into the unit at the site; and the necessary testing required on-site once the unit is installed to ensure that it operates correctly in all modes of operation. In addition, the location of the second condenser outside the building may detract from the appearance of the building.

It is known to have air conditioning/dehumidifying units for indoor swimming pools that heat the pool water. The units have a refrigerant/pool water heat exchanger. Older units used a simple water valve to control the flow of water through the heat exchanger as needed. Hot refrigerant gas was continually passed through the heat exchanger to heat the pool water. When heating of the pool water was not required, the hot gases passing through the heat exchanger caused mineralization of standing pool water in the heat exchanger. As a result, deposits built up in the heat exchanger and slowed the flow of water through it. Cleaning/replacement of the heat exchanger was expensive. Newer units now usually employ at least one diverter valve to divert hot refrigerant gas to the heat exchanger to heat the pool water as required. Diverter valves are however expensive to use and to replace since refrigerant must be removed from, and then added to, the refrigerant system during replacement.

SUMMARY OF THE INVENTION

It is one purpose of the present invention to provide an air conditioning/dehumidifying unit which unit is much easier and cheaper to build, install, operate, and service than known units. It is also the purpose of the present invention to provide a unit which is more versatile and efficient in operation than known units. It is another purpose of the present invention to provide an air conditioning/dehumidifying unit for indoor swimming pools which can be easily modified to simply and effectively heat pool water when required. It is a further purpose to the present invention to provide methods of simply and easily conditioning and treating air in enclosed spaces, and particularly in indoor swimming pools, and for heating swimming pool water when needed.

In accordance with the present invention there is provided an air conditioning/dehumidifying unit having novel air passageway means allowing use of a single condenser rather than two condensers. The unit is compact and thus requires a much smaller charge of refrigerant resulting in significant cost savings and, even more likely, in the use of alternative, more costly, environmental-friendly refrigerants. The unit is substantially completely assembled and tested at the place of manufacture and not at the installation site. No separate installation of a second condenser at the site is required. No mounting pad for a second condenser is needed and no installation of refrigerant lines or a separate electrical service is needed at the site. The unit is fully charged with refrigerant at the factory and not at the site thereby minimizing the possibility of refrigerant contamination or compressor damage while charging in the field. The unit can be fully tested at the factory rather than waiting for some of the testing to be completed at the site. The unit, being compact, is easily shipped and installed. Shipping costs are reduced since there is no separate, second condenser to ship.

The air conditioning/dehumidifying unit of the present invention can be readily operated in an air-conditioning mode, a dehumidifying mode; and a purge/ventilating mode. The unit, when used in an indoor swimming pool, can be modified to have a pool water heater and can be further operated in a pool water heating mode; an air-conditioning/pool water heating mode; and a dehumidifying/pool water heating mode. The unit can simply and easily modulate the head pressure of the refrigerant during operation thereby providing better efficiencies in the operation; better control of the properties of the air within the indoor area and better control of the heating of the pool water if a pool water heater is employed. The unit can also provide for lower static pressure during operation resulting in reduced operating costs.

The air conditioning/dehumidifying unit of the present invention employs air passageway means comprising two adjacent passageways for air passing through the unit. The second passageway normally is substantially larger in cross-sectional area than the first passageway. The first passageway has a first indoor air inlet and a first outdoor air inlet at one end and an indoor air supply outlet at the other end. An indoor air supply blower is located in the first passageway near the indoor air supply outlet. The second passageway has a second indoor air inlet and a second outdoor air inlet at the end and an outdoor air outlet at the other end. An outdoor air blower is located in the second passageway near the outdoor air outlet.

The unit has a refrigerant system which has a compressor, a single condenser, an expansion valve, and an evaporator, all the elements connected in series in a closed loop by refrigerant piping as is well known. The evaporator is located in the first passageway near the one end and the condenser is located in the second passageway about midway between the ends of the passageway. The unit has a damper associated with each of the four air inlets and a damper assembly downstream from the evaporator located in the first passageway and between the first and second passageways. The air from the evaporator can normally flow directly through the first passageway and out of the indoor air supply outlet. However the damper assembly can be used to selectively divert some or all of the air from the evaporator through the condenser in the second air passageway before leaving the indoor air supply outlet. The position of the air inlet dampers and of the dampers in the damper assembly for controlling the flow of air through the two passageways, along with the operation of the two blowers and the compressor in the refrigerant system, will depend on the mode of operation of the unit.

The installed unit can be operated as a dehumidifier for dehumidifying the air in an indoor area. In this mode of operation, with the indoor air supply blower and compressor operative and the outdoor air blower inoperative, air from the indoor area is passed into the first passageway from the first indoor air inlet and through the evaporator to remove moisture from it. The other three air inlets are closed. At least part of the air from the evaporator can be diverted by the damper assembly to the condenser in the second passageway to heat it, and then returned to the first passageway to mix with the remainder of the air from the evaporator before being returned to the indoor area. The damper assembly modulates the air flow over the condenser to control the head pressure of the refrigerant.

The unit can be operated as an air conditioner for conditioning the air in the indoor area. In this mode of operation, with both the blowers and the compressor operative, the indoor air is passed through the first passageway from the first indoor air inlet, through the evaporator to remove moisture from it, and returned directly to the indoor area via the indoor air outlet. Simultaneously, outside air is passed through the second passageway from the second outside air inlet, through the condenser to remove heat from the condenser, and back outside through the outdoor air outlet. The first outdoor air and the second indoor air inlets are closed.

The unit can also be used to purge or ventilate the indoor area. In this mode of operation, both blowers are operative but the compressor is normally inoperative. Air from the indoor area is exhausted by the outside air blower drawing the air into the second passageway from the second indoor air inlet, through the condenser, and to the outside through the outdoor air outlet. At the same time, replacement outside air is drawn into the indoor area through the first outdoor air inlet, the first air passageway, through the evaporator and through the indoor air outlet. The first indoor air and second outdoor air inlets are closed.

If the replacement air being brought in during purging is hot and humid, the compressor can be operated and the air brought in through the first outdoor air inlet in the first passageway is passed through the evaporator and cooled before entering the indoor area. The air being simultaneously exhausted from the indoor area through the second passageway passes through the condenser to remove the heat taken out of the air by the evaporator. If the air being added is cold, the compressor can be operated and at least some of the air from the evaporator can be routed through the condenser in the second passageway using the damper assembly to heat it before entering the indoor area. In this operation, the replacement air would be added alternatively with the removal of the indoor air. Alternatively, without using the compressor, a supplemental heater can be provided in the first passageway to heat the cold air.

The construction of the unit, in having the evaporator in a first passageway and the condenser in a second adjacent passageway, separate from the first passageway, provides for more efficient operation of the unit. The second passageway can be substantially larger in cross-sectional area than the first passageway and thus the face area of the condenser can be increased compared to the face area of the evaporator to increase the efficiency of the unit. During dehumidifying, the air passing through the condenser can have a larger area to pass through, reducing static pressure and thus reducing the power required to move the air. During air conditioning, the outside air passing through the second passageway and the condenser is at a lower static pressure since the air does not pass through the evaporator, which can be clogged with water droplets, and since the size of the condenser is increased. In addition, the static pressure in the first passageway is lowered when at least some of the air passes out through the passageway from the evaporator to the indoor area without having to pass through the condenser during dehumidifying and when all of the air from the evaporator avoids the condenser during air conditioning. As a result of reducing static pressure, overall power consumption is reduced.

The air conditioning/dehumidifying unit, when used in an indoor swimming pool, can have a pool water heat exchanger for heating pool water. With a pool water heat exchanger, the unit can be used to heat pool water, to dehumidify and heat pool water simultaneously, or to air condition and heat pool water simultaneously. Refrigerant from the condenser is passed directly through the heat exchanger to heat the water. The heating of the pool water is fully modulated by controlling the flow of water through the pool water heat exchanger. If the temperature of the water drops below a set point, the flow of pool water is started through the heat exchanger, via a pump in the water system, by opening a water valve. The flow can be increased by further opening of the valve if required. The temperature of the refrigerant passing through the heat exchanger is controlled by controlling its head pressure. The head pressure is controlled by modulating the flow of air over the condenser through the damper assembly. If the air flow is reduced, the head pressure is increased, increasing the temperature of the refrigerant. If the air flow is increased, the head pressure is reduced, reducing the temperature of the refrigerant. Refrigerant normally enters the pool water heat exchanger as a hot gas to heat the water and as a hot or warm liquid when little or no heating is required. If there is no pool water flowing through the heat exchanger, the head pressure is decreased to have refrigerant flow as a warm liquid through the heat exchanger so as to avoid overheating the stagnant water in the heat exchanger.

The unit provides simple control of the head pressure of the refrigerant without requiring the use of expensive regulating valves. During most modes of operation of the unit, the temperature of the refrigerant, either after leaving the condenser, or after leaving the pool water heat exchanger, can be sensed by a temperature sensor to give an indication of the head pressure. If the temperature sensed is low, the temperature sensor can control the damper assembly or the outside air blower to allow less air flow through the condenser thus increasing the head pressure. If the temperature sensed is high, the damper assembly, during dehumidifying, dehumidifying/pool water heating or pool water heating modes, can be modulated to allow more air to flow through the condenser thus lowering the head pressure. During air conditioning and air conditioning/pool water heating modes, the outside air blower speed can be modulated to control the flow of outside air through the condenser to control head pressure.

The invention is particularly directed toward an air conditioning/dehumidifying unit with a first air passageway and a second air passageway adjacent to the first air passageway. Dampered inlets at one end of the passageways selectively provide indoor air or outdoor air to each passageway. The first passageway has an indoor air outlet and the second passageway has an outdoor air outlet, both outlets at the other end of the passageways. A first blower is provided in the first passageway and a second blower is provided in the second passageway for moving air through each passageway. A refrigerant system is provided on the unit with an evaporator in the first passageway, a compressor, a condenser in the second passageway and a refrigerant line joining the evaporator, the compressor and the condenser, in series, in a closed loop. The unit has a damper assembly for selectively directing at least some air from the evaporator in the first passageway through the condenser in the second passageway, if desired, before passing it out the indoor air outlet in the first passageway.

The unit can have a pool water heat exchanger for heating pool water. The refrigerant line in the refrigerant system then leads from the condenser to the heat exchanger and from the heat exchanger to the evaporator. There are no valves in the refrigerant line section leading from the condenser to the heat exchanger. A refrigerant condition sensor in the line, near but downstream of the heat exchanger, controls the damper assembly to control the head pressure of the refrigerant.

DETAILED DESCRIPTION OF THE INVENTION

Figure 1:
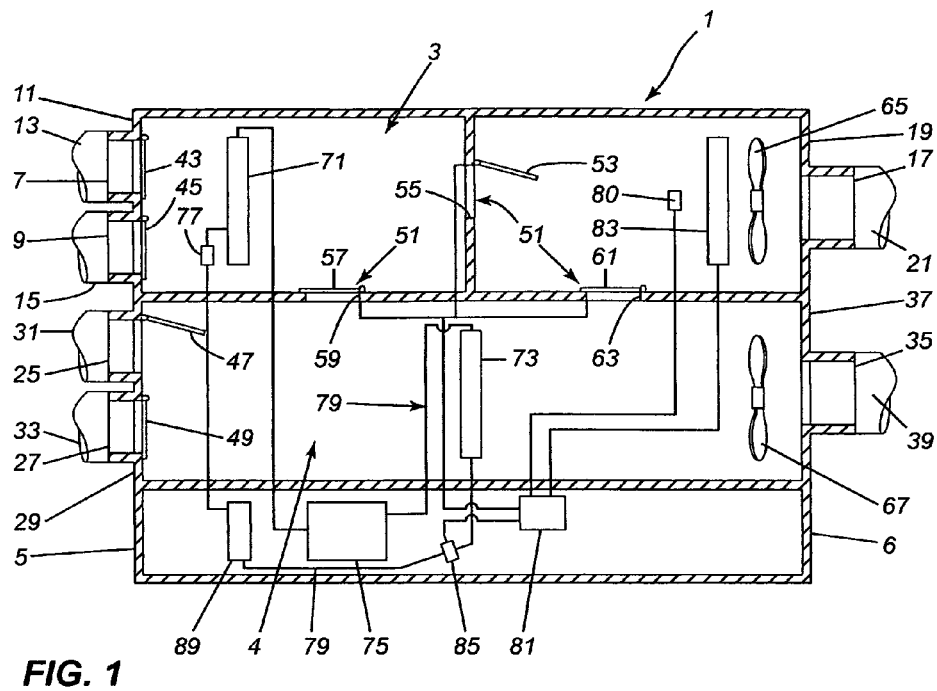
FIG. 1 is a schematic elevation view of the air conditioning/dehumidifying unit.

The air conditioning/dehumidifying unit 1, shown in FIG. 1, has a first, preferably straight, air passageway 3 and a second, preferably straight, air passageway 4 extending through the unit between the ends 5, 6 of the unit. The second air passageway 4 is preferably adjacent and parallel to the first air passageway 3 and they preferably share a common wall 7. The first air passageway 3 has a first indoor air inlet 8 and a first outdoor air inlet 9 at one end 11 of the passageway. The first air inlets 8, 9 extend through one end 5 of the unit. The first indoor air inlet 8 is connected to an indoor air return duct 13 on site to bring air from an indoor area to the first air passageway 3. The first outdoor air inlet 9 is connected to an outdoor air duct 15 to bring air, from outside an enclosure enclosing the indoor area and the unit, to the first air passageway 3. The first air passageway 3 also has an indoor air outlet 17 at the other end 19 of the passageway. The indoor air outlet 17 extends through the other end 6 of the unit and connects to an indoor air supply duct 21 for returning air to the indoor area.

The second air passageway 4 has a second indoor air inlet 25 and a second outdoor air inlet 27 at one end 29 of the passageway. The second air inlets 25, 29 also extend through the one end 5 of the unit. The second indoor air inlet 25 is connected to a second indoor air return duct 31 that brings air from the indoor area to the second air passageway 4. The second outdoor air inlet 27 is connected to a second outdoor air duct 33 to bring air from outside the enclosure into the passageway 4. The second air passageway 4 also has an outdoor air outlet 35 at the other end 37 of the passageway. The outdoor air outlet 35 extends through at the other end 6 of the unit and connects to an outdoor air return duct 39 for returning air from the passageway 4 to the outside.

While the indoor air inlets, outdoor air inlets, indoor air outlet and outdoor air outlet have been shown as being located in the ends 5, 6 of the unit 1, it is to be understood that they can also all be located in one of the sides 40 of the unit with the indoor air inlets 8, 25 and outdoor air inlets 9, 27 located adjacent the end 5 of the unit and the outlets 17, 35 located adjacent the other end 6 of the unit. Air inlets 8, 9 are still at the end 11 of the passageway 3 and indoor air outlet 17 is still at the other end 19 of passageway 3. Similarly, air inlets 25, 27 are still at the end 29 of passageway 4 and the outdoor air outlet is still at the other end 37 of passageway 4. Having the inlets and outlets in one side of the unit allows the unit to be mounted in an interior corner of the enclosure.

Dampers are provided on all four air inlets 7, 9, 25 and 27. The damper 43 on the first indoor air inlet 8 is normally closed. The damper 45 on the first outdoor air inlet 9 is also normally closed. The damper 47 on the second indoor air inlet 25 is normally open. The damper 49 on the second outdoor air inlet 27 is normally closed. The dampers 43, 45, and 49 that are normally closed can be selectively powered open and the damper 47 that is normally open can be selectively powered closed. A damper assembly 51 is also provided in both air passageways 3, 4 about midway between the ends 5, 6 of the unit for selectively moving air from the first air passageway 3 to the second air passageway 4 and then back to first air passageway 3. The damper assembly 51 has a first assembly damper 53 in the first air passageway 3 about midway between the ends 11, 19 of the first air passageway 3 that is normally open, opening a through port 55 in a cross-wall 56 in the first passageway. The damper assembly 51 includes a second assembly damper 57 in front of the first assembly damper 53 and normally closing a first bypass port 59 in the common wall 7 connecting the first passageway 3 to the second passageway 4, and a third assembly damper 61 behind the first assembly damper 53 and normally closing a second bypass port 63 in the common wall 7 connecting the second passageway 4 to the first passageway 3. The assembly dampers 53, 57 and 61 in the damper assembly 51 are operated in unison by a single operator through suitable known linkages (not shown). The dampers 53, 57, 61 in the damper assembly 51 in their normal flow-through position, as described, allow air to flow directly through the first passageway 3 from one end to the other. When the position of the dampers is reversed to a by-pass position (i.e. the open damper 53 is closed and the closed dampers 57, 61 are opened) air flows from the first passageway 3 to the second passageway 4 through first by-pass port 59 and then back to the first passageway 3 through the second by-pass port 63. The damper assembly 51 can be used to modulate the air flow from the first passageway 3 to the second passageway 4 and back to the first passageway 3 by partly closing the damper 53 in the first passageway 3 and partly opening the dampers 57, 61 in the bypass ports 59, 63. An indoor air blower 65 is provided in the first passageway 3 near its other end 19 and an outdoor air blower 67 is provided in the second passageway 4 near its other end 37.

The unit has a self-contained refrigerant system with an evaporator 71 in the first passageway 3 near the one end 11 of the passageway to intercept air passing through the passageway 3. The evaporator 71 is located in front of the damper assembly 51. The refrigerant system has a condenser 73 in the second passageway 4 about midway between its ends 29, 37, and between the first and second by-pass ports 59, 63 to intercept air passing through the second passageway 4. The refrigerant system also has a compressor 75 and an expansion valve 77 carried by the unit 1 outside the first and second passageways 3, 4. The compressor 75, the condenser 73, the expansion valve 77 and the evaporator 71 are connected in series in a closed loop by suitable refrigerant piping 79 as is well known.

The cross-sectional areas of the first and second air passageways 3, 4 will depend on the size of the coils in the evaporator 71 and condenser 73 respectively, as selected for a particular application. The second air passageway 4 generally will be substantially larger in cross-sectional area than the first passageway 3. The cross-sectional area of the second passageway 4 can be up to one hundred and thirty percent larger than the cross-sectional area of the first passageway 3. Preferably, the cross-sectional area of the second passageway 4 is between fifty and one hundred percent larger than the cross-sectional area of the first passageway 3. The larger cross-sectional area of the second passageway 4 allows the condenser 73 in the second passageway to have a larger air surface area than the surface area of the evaporator 71 in the first passageway 3. The larger surface area for the condenser 73 is particularly useful in the air-conditioning mode to be able to remove the heat given up by the air in passing through the condenser 73 efficiently.

Figure 2:
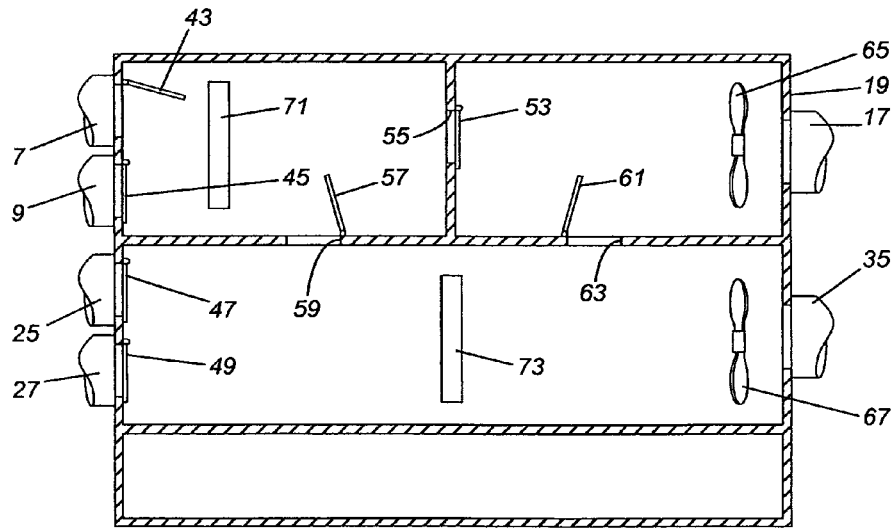
FIG. 2 is a schematic elevation view of the unit in a dehumidifying mode of operation.

When the unit 1 is used in a dehumidifying mode, as shown in FIG. 2, the compressor 75 is turned on as is the indoor air blower 65 in the first passageway 3. The outdoor air blower 67 is off. The damper 47 on the second indoor air inlet 25 is powered closed. The damper 49 on the second outdoor air inlet 27 is closed. The damper 43 on the first indoor air inlet 8 is powered open and the damper 45 on the first outdoor air inlet 9 is normally closed. The assembly dampers in the damper assembly 51 are in a by-pass position with assembly damper 53 partly closing the first passageway 3 and assembly dampers 57, 61 opened to partly open the first and second by-pass ports 59, 63. With the unit 1 set up as described above, air from the indoor area is drawn into the first passageway 3 of the unit 1 by the indoor air blower 65 through the first indoor air return inlet 8. The air passes through the evaporator 71 where it is cooled to remove moisture and then some of the air passes through the opened first bypass port 57 into the second passageway 4. In the second passageway 4, the air passes through the condenser 73 to heat it, through the second bypass port 59 back into the first passageway 3 to combine with the remaining air from the evaporator, and back to the indoor area through the indoor air outlet 17. The amount of air flowing over the condenser 73 is modulated by the damper assembly 51 to control both the amount of heat given to the air and the head pressure of the refrigerant.

Figure 3:
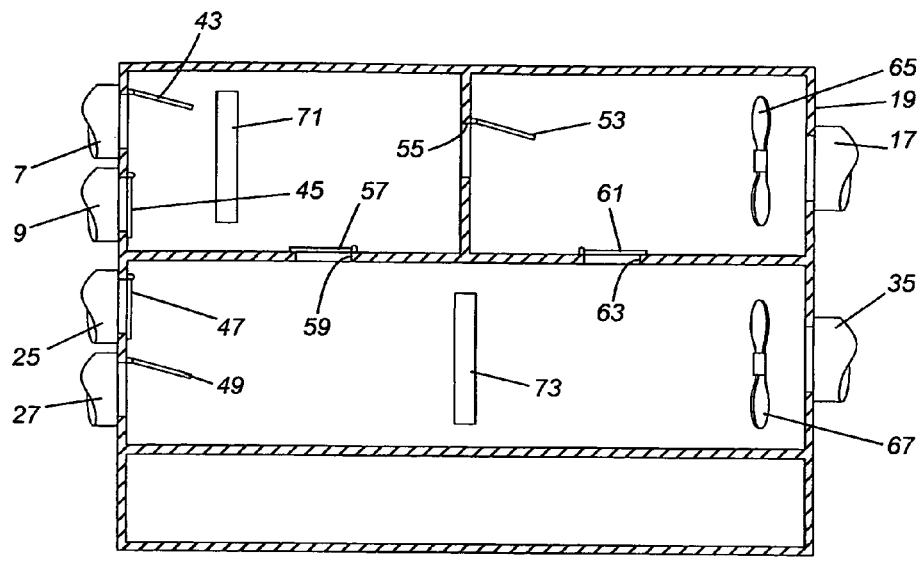
FIG. 3 is a schematic elevation view of the unit in an air conditioning mode of operation.

When the unit 1 is used in an air conditioning mode, as shown in FIG. 3, the compressor 75 is turned on as are both the indoor air blower 65 and the outdoor air blower 67. The damper 49 on the second outdoor air inlet 27 is powered open. The damper 47 on the second indoor air inlet 25 is powered closed. The damper 45 on the first outdoor air inlet 9 is normally closed. The damper 43 on the first indoor air inlet 8 is powered open. The damper assembly 51 is in the flow-through position with the assembly damper 53 opened to open port 55 and thus the first passageway 3 and the assembly dampers 57, 61 closed to close the by-pass ports 59, 63. With the unit set up as described, return air from the indoor area is drawn into the first passageway 3 of the unit by the indoor air blower 65 through the first indoor air inlet 8. The air passes through the evaporator 71 where moisture is removed from the air, and then continues through the passageway 3 and back to the indoor area through the indoor air return outlet 17. Outside air is simultaneously drawn into the second passageway 4 by the outdoor air blower 67 through the second outdoor air inlet 27, passing through the condenser 73 to take heat from the condenser, and then out the outlet 35 to the outside. In having the indoor air pass only through the first passageway 3 and the evaporator 71, and not pass through an inactive reheat condenser as in prior art systems, the system has reduced static pressure and thus requires less power. With the passageway 4 larger in cross-sectional area than the first passageway 3, the condenser 73 can have a larger surface area thereby reducing static pressure as the outside air flows through the condenser 73 and requiring less power to operate the unit. The outside air flowing through the condenser 73 can be modulated by the changing the speed of the outside air blower 67 to control both the amount of heat removed from the condenser 73 and the head pressure of the refrigerant.

Figure 4:
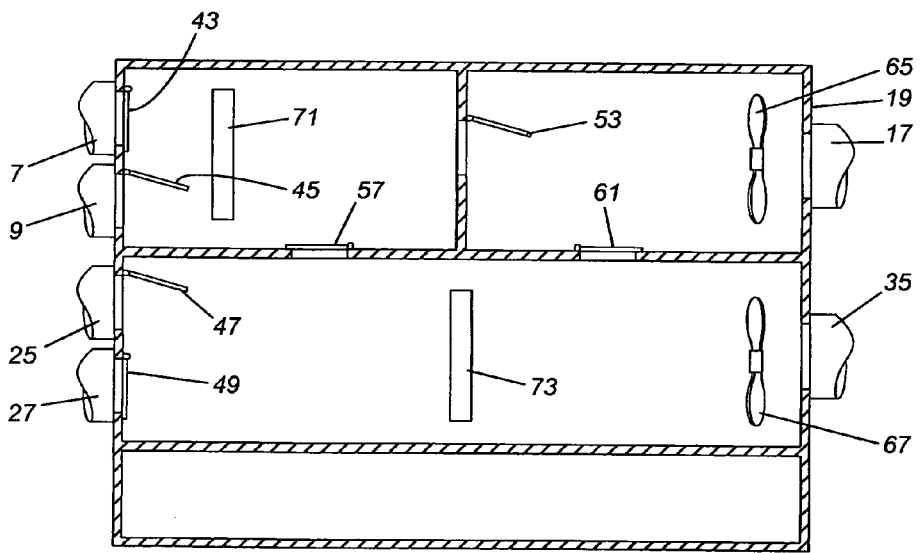
FIG. 4 is a schematic elevation view of the unit in a purge/ventilating mode of operation.

The unit 1 can be used to completely purge the indoor area or to ventilate it. If the indoor area is an indoor pool area, the pool area can be purged to get rid of contaminants in the pool area such as chloramines, regardless of other pool area air conditions such as its humidity. The indoor area can be ventilated when outside air conditions are suitable for conditioning the air in the indoor area without having to use the compressor. Ventilating can occur, for example, when cooling of the indoor area is required and the outside air is cool enough to do this. When the unit 1 is used in a purge/ventilating mode, as shown in FIG. 4, the compressor 75 is normally turned off and both the indoor air blower 65 and the outdoor air blower 67 are turned on. The damper 49 on the second outdoor air inlet 27 is closed. The damper 47 on the second indoor air inlet 25 is open. The damper 45 on the first outdoor air inlet 9 is powered open. The damper 43 on the first pool air inlet 8 is closed. The damper assembly 51 is in the flow-through position with damper 53 open and dampers 57, 61 closed. With the unit set up as described, outside air is drawn into and through the first passageway 3 by the indoor air blower 65 via inlet 9 and into the indoor area through indoor air outlet 17, while air from the indoor area is drawn through the second passageway 4 by the outdoor air blower 67 via inlet 25 and outlet 35 to the outside. An air temperature sensor 80 can be provided in the first passageway 3 to sense the temperature of the outside air passing into the indoor area. The sensor 80 is connected to a controller 81, and if the temperature sensed is too cool, a heater 83 in the first passageway 3 can be turned on by the controller 81 to heat the air entering the indoor area. If the outside air is quite humid the compressor 75 could be turned on to have the evaporator 71 take moisture out of the outside air going into the indoor area. The indoor air going out in passageway 4 would take heat away from the condenser 73. The purge/ventilation mode can be turned on manually or by a timer. The heater 83 could also be used to supplementally heat the air returning to the pool in the dehumidifying mode.

During the dehumidifying mode the head pressure of the refrigerant can be maintained at the required operating level by modulating the air flow over the condenser 73. A refrigerant condition sensor such as a temperature sensor 85 senses the temperature of the liquid refrigerant in the section of refrigerant line 79 leaving the condenser 73 and passing to the expansion valve 77 via a receiver 89. The sensor 85 is connected to the controller 81. If the temperature of the liquid refrigerant drops below a predetermined set point, the controller 81 modulates the air flow over the condenser 73 by partly closing the damper assembly 51 to reduce the air flow over the condenser 73 and thus increase the head pressure. The damper assembly 51 can be opened more if the temperature of the refrigerant rises above a predetermined set point thus increasing the air flow over the condenser and lowering the head pressure. The head pressure can be controlled by a pressure transducer (not shown) instead of a temperature sensor if desired. The transducer is connected to the refrigerant line 79 to measure the vapour pressure of the refrigerant and to use the measure of this condition of the refrigerant to control the damper assembly 51 through the controller 81.

During the air conditioning mode, the head pressure of the refrigerant can be controlled by controlling the speed of the blower 67 in the second passageway 4 so as to control the amount of air passing over the condenser 73 in the passageway. The blower speed can be controlled, via the controller 81, by the refrigerant temperature sensor 85 that senses the temperature of the refrigerant or by a pressure transducer.

Figure 5:
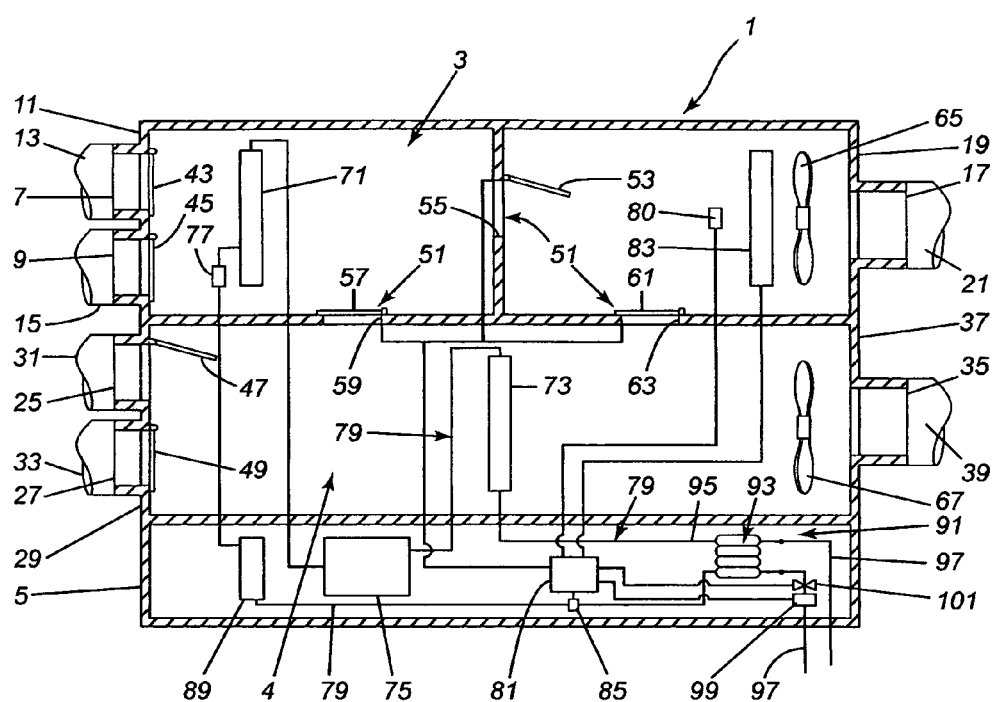
FIG. 5 is a schematic elevation view of the unit with a pool water heating system.

The unit 1, if used in an indoor swimming pool area, can include pool water heating means. As shown in FIG. 5, the pool water heating means 91 can comprise a heat exchanger 93 inserted into the refrigerant line 79 just after it leaves the condenser 73. There is no valve in the section 95 of line 79 between the condenser 73 and the heat exchanger 93. Pool water from the pool is passed to, and returned from, the heat exchanger 93 via a line 97. A pool water temperature sensor (not shown) senses the temperature of the water and, through controller 81, controls a water valve 101 in the water line 97 allowing the pool water to flow through the heat exchanger 93 so as to be heated by the refrigerant passing through the heat exchanger. A pump (not shown) pumps the water through the heat exchanger. When the pool water temperature is at a set point, the valve 101 is closed, and the refrigerant from the condenser passing through the heat exchanger 93 is a warm liquid. The refrigerant normally is not warm enough to foul any standing water in the heat exchanger. If the pool water temperature sensor senses a slight drop of the water temperature below the set point, the valve 101 is slightly opened to start a flow of water through the heat exchanger 93 to be heated by the refrigerant. If the temperature continues to drop the flow of water is increased by further opening of the valve 101. As more heating is required, the refrigerant temperature drops and the head pressure is reduced. This is sensed by the refrigerant temperature sensor 85 and the air passing over the condenser 73 is accordingly reduced by adjusting the damper assembly 51, or the speed of the outside air blower 67, depending on the mode of operation of the unit, to allow the refrigerant head pressure to rise and the refrigerant to heat up to a hot gas to continue heating the water. As the water temperature approaches the set point, the water flow is reduced by the valve 101 and the damper assembly 51 adjusts to allow more air to flow over the condenser. The water flow can be continually modulated so that the water temperature never strays far from the set point.

The unit can be operated in a dehumidifying/pool water heating mode. The dehumidifying operation is the same as described above in paragraph [1029] for an indoor environment except that the refrigerant is being passed through the heat exchanger on emerging from the condenser. While dehumidifying of the air is occurring, the pool water may require heating. If it does and the head pressure drops, the damper assembly 51 will adjust to pass less air over condenser 73 and thus raise the head pressure and increase the refrigerant temperature to continue heating the water. As this happens the dehumidifying process continues.

The unit can also be operating in an air conditioning/water heating mode. The air conditioning mode is the same as described above in paragraph [1030] except that refrigerant is being passed through the heat exchanger on emerging from the condenser. While air conditioning is occurring, the pool water may require heating. If it does and the head pressure starts to drop, the outdoor air blower will slow down to pass less air past the condenser 73 and thus raise the head pressure and the temperature of the refrigerant to continue heating the water to the set point. As this happens the air conditioning process continues.

If desired, the unit can be modified to include a water cooled condenser for use in place of the air cooled condenser 73 used for heat rejection. In this embodiment, where for some reason, outdoor air is not available for heat rejection from the air cooled condenser during air conditioning, the unit would have a water cooled condenser 111 that could be employed in place of the air cooled condenser 73. The water cooled condenser 111 could be mounted alongside the pool water heat exchanger 93 or in the area of the pool water heat exchanger if one is not used. When operational, the water cooled condenser 111 would have a supply of water (not shown) hooked up to the condenser with in and out lines 113, 115 with a suitable control valve 117 to turn on the water to run it through the condenser. A diverter valve 119 can be provided in the line 79 to divert the refrigerant from the compressor 75, either before or after it has passed through the condenser 73, to the water cooled condenser 111 via a line 121 and from the water cooled condenser 111 back to the line 79 before entering the evaporator. The water cooled condenser 111 would operate when the air cooled condenser 73 was not operational. The outdoor air inlets would remain closed and the outside air fan would be inoperative. The diverter valve 119 and the water control valve 117 could both be operated from the control unit 81.

The unit can be modified to by removing the damper assembly there from. Without the damper assembly the unit could still be operated as an air conditioning/purging/ventilating unit. The modified unit could also still be used with a pool water heater and with a water cooled condenser if desired.

I claim:

1. An air conditioning unit having: a first air passageway and a second air passageway adjacent to the first air passageway; a first dampered indoor air inlet and a first dampered outdoor air inlet at one end of the first air passageway; a second dampered indoor air inlet and a second dampered outdoor air inlet at one end of the second air passageway; the one ends of the first and second air passageways adjacent each other; the first and second indoor and outdoor air inlets selectively providing indoor or outdoor air to each passageway; an indoor air outlet in the first air passageway and an outdoor air outlet in the second air passageway, both outlets at the other end of the passageways; a first blower in the first passageway for moving air through the first passageway and a second blower in the second passageway for moving air through the second passageway; and a refrigerant system with an evaporator in the first passageway, a compressor, a condenser in the second passageway, and a refrigerant line joining the evaporator, the compressor, and the condenser, in series, in a closed loop.

2. The air conditioning unit as claimed in claim 1 including a damper assembly for selectively directing at least some air, if desired, from the evaporator in the first passageway, through the condenser in the second passageway, and out the indoor air outlet in the first passageway.

3. The unit as claimed in claim 2 wherein the damper assembly comprises: a first assembly damper in the first passageway for controlling air flow directly between the evaporator and the indoor air outlet; a second assembly damper controlling air flow from the first to the second passageway and located between the evaporator and the first assembly damper in the first passageway and between the air inlets and the condenser in the second passageway; and a third assembly damper controlling air flow from the second to the first passageway and located between the condenser and the outdoor air outlet in the second passageway and between the first assembly damper and the indoor air outlet in the first passageway.

4. The unit as claimed in claim 3 wherein the three assembly dampers are linked together to be able to move the dampers in unison to anywhere between a full flow-through position where the first assembly damper fully opens the first passageway and the second and third assembly dampers fully close air flow between the first and second passageways and a full by-pass position where the first assembly damper fully closes the first passageway and the second and third assembly dampers fully open air flow between the first and second passageways.

5. The unit as claimed in claim 1 wherein the second passageway can have a cross-sectional area up to one hundred and thirty percent larger than the cross-sectional area of the first passageway.

6. The unit as claimed in claim 2 wherein the second passageway can have a cross-sectional area up to one hundred and thirty percent larger than the cross-sectional area of the first passageway.

7. The unit as claimed in claim 1 including pool water heating means on the unit, the pool water heating means having a heat exchanger, an inlet water line for passing pool water to the heat exchanger, and an outlet water line for returning the pool water from the heat exchanger; the refrigerant line passing from the condenser through the heat exchanger to the evaporator, the section of refrigerant line between the condenser and the heat exchanger being valveless.

8. The unit as claimed in claim 4 including pool water heating means on the unit, the pool water heating means having a heat exchanger, an inlet water line for passing pool water to the heat exchanger, and an outlet water line for returning the pool water from the heat exchanger; the refrigerant line passing from the condenser through the heat exchanger to the evaporator, the section of refrigerant line between the condenser and the heat exchanger being valveless.

9. The unit as claimed in claim 5 including pool water heating means on the unit, the pool water heating means having a heat exchanger, an inlet water line for passing pool water to the heat exchanger, and an outlet water line for returning the pool water from the heat exchanger; the refrigerant line passing from the condenser through the heat exchanger to the evaporator, the section of refrigerant line between the condenser and the heat exchanger being valveless.

10. The unit as claimed in claim 7 including a valve in the outlet water line, a water temperature sensor for sensing the temperature of the water in the outlet water line, the sensed temperature used to control the position of the valve to control flow of water through the heat exchanger to maintain the pool water at about a set point temperature.

11. The unit as claimed in claim 8 including a valve in the outlet water line, a water temperature sensor for sensing the temperature of the water in the outlet water line, the sensed temperature used to control the position of the valve to control flow of water through the heat exchanger to maintain the pool water at about a set point temperature.

12. The unit as claimed in claim 2 including a condition sensor for sensing a condition of the refrigerant in the refrigerant line after it leaves the condenser, the condition sensor controlling the damper assembly to modulate the amount of air flowing through the condenser so as to maintain the head pressure of the refrigerant between desired limits.

13. The unit as claimed in claim 4 including a condition sensor for sensing a condition of the refrigerant in the refrigerant line after it leaves the condenser, the condition sensor controlling the damper assembly to modulate the amount of air flowing through the condenser so as to maintain the head pressure of the refrigerant between desired limits.

14. The unit as claimed in claim 1 including a water/refrigerant heat exchanger in the unit, a branch line leading from the refrigerant line after the compressor and before the evaporator to the water/refrigerant heat exchanger and back to the refrigerant line before the evaporator for selectively directing refrigerant from the compressor to the water/refrigerant heat exchanger, and from the water/refrigerant heat exchanger to the evaporator and a water line for passing water through the water/refrigerant heat exchanger from a water source.

15. The unit as claimed in claim 4 including a water/refrigerant heat exchanger in the unit, a branch line leading from the refrigerant line after the compressor and before the evaporator to the water/refrigerant heat exchanger and back to the refrigerant line before the evaporator for selectively directing refrigerant from the compressor to the water/refrigerant heat exchanger, and from the water/refrigerant heat exchanger to the evaporator and a water line for passing water through the water/refrigerant heat exchanger from a water source.

16. The method of operating the unit as claimed in claim 2 in a dehumidifying mode comprising: operating the compressor; operating the first blower in the first passageway; not operating the second blower in the second passageway; opening the first indoor air inlet in the first passageway to pass indoor air from an indoor area through the evaporator to remove moisture there from and closing the other air inlets in the first and second passageways; and placing the damper assembly in a by-pass position to pass at least some of the indoor air from the evaporator into the second passageway, through the condenser to heat it, and back to the first passageway to join any remaining indoor air from the evaporator, and then passing the air back to the indoor area through the indoor air outlet.

17. The method of operating the unit as claimed in claim 2 in an air conditioning mode comprising: operating the compressor; operating the first and second blowers in the first and second passageways; opening the first indoor air inlet in the first passageway to pass indoor air from an indoor area through the evaporator to remove moisture from the air; opening the second outdoor air inlet in the second passageway to pass outside air through the condenser; closing the other air inlets; placing the damper assembly in a flow-through position to pass all the indoor air from the evaporator through the first passageway and back to the indoor area out the indoor air supply outlet, all the outside air from the second outdoor air inlet in the second passageway passing through the condenser to the outside through the outside air outlet, the outside air removing heat from the condenser.

18. The method of operating the unit as claimed in claim 2 in a purge/ventilating mode comprising: turning the compressor off; operating the first and second blowers in the first and second passageways; opening the first outdoor air inlet in the first passageway; opening the second indoor air inlet in the second passageway; closing the other air inlets; and placing the damper assembly in a flow-through position to pass the outside air from the first outdoor air inlet through the evaporator and the first passageway and to the indoor area through the indoor air outlet; and to pass the indoor air from indoor area through the second indoor air inlet, through the condenser, and the second passageway to the outside through the outdoor air outlet.

19. The method of operating the unit as claimed in claim 16 in a dehumidifying mode including modulating the head pressure of the refrigerant in the refrigerant system by sensing the condition of the refrigerant as it leaves the condenser, and using the sensed condition to modulate the damper assembly to control the amount of air flowing over the condenser to maintain the head pressure of the refrigerant at a desired level.

20. The method of operating the unit as claimed in claim 17 in an air conditioning mode including modulating the head pressure of the refrigerant in the refrigerant system by sensing the condition of the refrigerant as it leaves the condenser, and using the sensed condition to control the speed of the second blower in the second passageway to control the amount of air flowing over the condenser to maintain the head pressure of the refrigerant at a desired level.

21. The method of operating the unit as claimed in claim 18 in a purge/ventilating mode including turning on the compressor to dehumidify the outside air entering the indoor area through the first passageway as it passes through the evaporator.

22. The method of operating the unit as claimed in claim 18 in a purge/ventilating mode including heating the outside air if needed with a heater in the first passageway near the other end of the passageway.

23. The method of operating the unit as claimed in claim 8 in a dehumidifying/pool water heating mode comprising: operating the compressor; operating the first blower in the first passageway; not operating the second blower in the second passageway; opening the first indoor air inlet in the first passageway to pass indoor air from a pool area through the evaporator and closing the other air inlets in the first and second passageways; placing the damper assembly in a by-pass position to pass at least some of the indoor air from the evaporator into the second passageway, through the condenser, back to the first passageway to join any remaining indoor air from the evaporator and back to the indoor area through the indoor air outlet; passing pool water through the heat exchanger, and sensing the condition of the refrigerant leaving the heat exchanger to operate the damper assembly to control the head pressure of the refrigerant by controlling the amount of air passing over the condenser.

24. The method of operating the unit as claimed in claim 8 in an air conditioning/pool water heating mode comprising: operating the compressor; operating the first and second blowers in the first and second passageways; opening the first indoor air inlet in the first passageway to pass indoor air through the evaporator; opening the second outdoor air inlet in the second passageway to pass outside air through the condenser; closing the other air inlets; placing the damper assembly in a flow-through position to pass all the indoor air from the evaporator through the first passageway and back to the indoor area out the indoor air supply outlet; all the outside air from the second outdoor air inlet in second passageway passing through the condenser to the outside through the outside air outlet; passing pool water through the heat exchanger, and sensing the condition of the refrigerant leaving the heat exchanger to operate the second blower in a manner to control the head pressure of the refrigerant by controlling the amount of air passing over the condenser.

25. The method of operating the unit as claimed in claim 8 in a pool water heating mode comprising: operating the compressor; operating the first blower in the first passageway; not operating the second blower in the second passageway; opening the first indoor air inlet in the first passageway to pass indoor air through the evaporator, closing the other air inlets in the first and second passageways; passing the air through the evaporator without removing any moisture therefrom; placing the damper assembly in a by-pass position to pass at least some of the indoor air from the evaporator into the second passageway, through the condenser, back to the first passageway to join any remaining indoor air from the evaporator, and back to the indoor area through the indoor air outlet; passing pool water through the heat exchanger, and sensing the condition of the refrigerant leaving the heat exchanger to operate the damper assembly to control the head pressure of the refrigerant by controlling the amount of air passing over the condenser.

26. The method of operating the unit as claimed in claim 1 in an air conditioning mode comprising: operating the compressor; operating the first and second blowers in the first and second passageways; opening the first indoor air inlet in the first passageway to pass indoor air from an indoor area through the evaporator to remove moisture from the air; opening the second outdoor air inlet in the second passageway to pass outside air through the condenser; closing the other air inlets; all the indoor air from the evaporator passing through the first passageway and back to the indoor area out the indoor air supply outlet, all the outside air from the second outdoor air inlet in the second passageway passing through the condenser to the outside through the outside air outlet, the outside air removing heat from the condenser.

27. The method of operating the unit as claimed in claim 1 in a purge/ventilating mode comprising: turning the compressor off; operating the first and second blowers in the first and second passageways; opening the first outdoor air inlet in the first passageway; opening the second indoor air inlet in the second passageway; closing the other air inlets; and passing the outside air from the first outdoor air inlet through the evaporator and the first passageway and to the indoor area through the indoor air outlet; and passing the indoor air from indoor area through the second indoor air inlet, through the condenser, and the second passageway to the outside through the outdoor air outlet.

* * * * *